July 20, 1948.                S. BOUSKY                2,445,384
                            ERECTOR SYSTEM Filed Jan. 24, 1945                              2 Sheets-Sheet 1

INVENTOR.
SAMUEL BOUSKY
BY Frank H. Harmon
ATTORNEY

Patented July 20, 1948

2,445,384

UNITED STATES PATENT OFFICE 2,445,384

ERECTOR SYSTEM

Samuel Bousky, Shaker Heights, Ohio, assignor, by mesne assignments, to Jack & Heintz Precision Industries, Inc., Cleveland, Ohio, a corporation of Delaware Application January 24, 1945, Serial No. 574,340

6 Claims. (Cl. 74—5)

This invention relates to suspension means for gyroscopic assemblies and has for one of its primary objects to provide an improved erecting system therefor.

In contrast to the conventional horizon gyro assembly including a vertical axis gyro wheel and a gyro housing provided with air ports controlled by erection pendulums of the type shown in United States Letters Patent to Bert G. Carlson, No. 2,344,126, dated March 14, 1944, it is an object of the invention to provide a new and novel type of suspension that in itself will render the gyro assembly inherently self-erecting with respect to craft carrying the assembly.

The precision of operation of the conventional gravity responsive pendulums to control air ports for erecting purposes is so critical that they are difficult to fabricate and install with the required degree of care necessary to insure their proper functioning. Moreover, any such erecting systems which depend upon air have an inherent limitation in aircraft in that if such a system should operate effectively at level and minor altitudes they are ineffective at high altitudes because the normal air pressure at such high altitudes is so low as to make the erecting system ineffective.

In order to avoid this risk it is proposed to provide a system of gimbal frame suspension for gyro assemblies wherein the inner gyro rotor carrying gimbal is suspended in the outer pivoted gimbal in such a manner that when the gyro precesses in either direction in a plane at right angles to the plane of suspension of the inner gimbal, the latter as it rotates is linearly shifted in a corresponding direction in its plane of suspension. The object of providing such a plane of suspension is to utilize the consequent shift of the center of gravity of the gyro assembly to overbalance the outer gimbal and to utilize this overbalance as an automatic means of erection thereof. This new principle of gyro erection may be used for the self-erection of any type of gyro assemblies employing a gyro rotor having a vertical spin axis regardless of whether the rotor is spun pneumatically, hydraulically or electrically. For instance, it may be employed in a bank indicator or in an automatic pilot for the control of bank. It may also be employed in a climb and dive indicator or in an automatic pilot for the control of dive and climb.

For example in a climb and dive indicator or in an automtaic pilot for controlling climb and dive, the gimbal suspension for the vertical spin axis gyro will include an outer gimbal mounted on an axis normally coincidental with the transverse axis of the aircraft. The outer gimbal may carry an indicator pointer in such a manner that rotation of the outer gimbal about its transverse axis will give a climb and dive signal. The inner gimbal carries the vertical spin axis gyro wheel and has its two longitudinally extending trunnions engage ball bearing assemblies carried by the outer gimbal. The trunnions and bearings are of such design as to engage each other in such a manner that if in a climb or dive of the aircraft the gyro wheel precesses it rotates about its axis of suspension and also moves linearly with respect to its plane of suspension. This shift of the inner gimbal and its rotor rearwardly or forwardly in its plane of suspension overbalances the outer gimbal, causing it to pivot, for providing a gyro assembly that is inherently self-erecting with respect to the craft carrying the gyro assembly.

With the foregoing and other objects in view, the invention resides in the combination of parts and in the details of construction hereinafter set forth in the following specification and appended claims, certain embodiments thereof being illustrated in the accompanying drawings in which:

Figure 1:
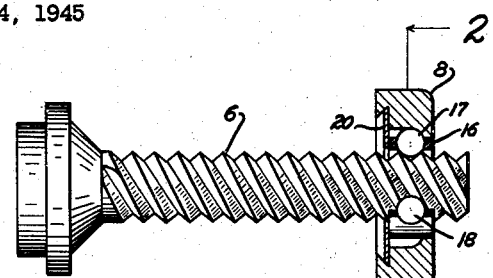
Figure 1 is an enlarged view in side elevation of one of the forms of the invention in which the inner gimbal has triple lead threaded pivots, the ball bearing assembly to be carried by the outer gimbal being shown in vertical section and in engagement with the pivot.
Figure 2:
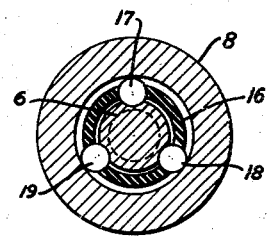
Figure 2 is a view in cross section taken along line 2—2 of Figure 1 through the bearing and pivot.
Figure 3:
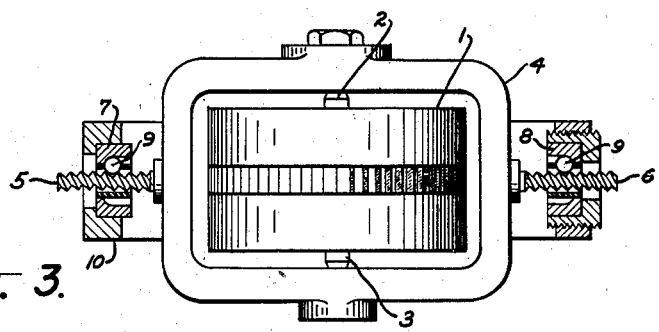
Figure 3 is a view in elevation of the gyro rotor and the inner gimbal with its screw pivots, the outer gimbal and its bearing assembly being shown in section.
Figure 4:
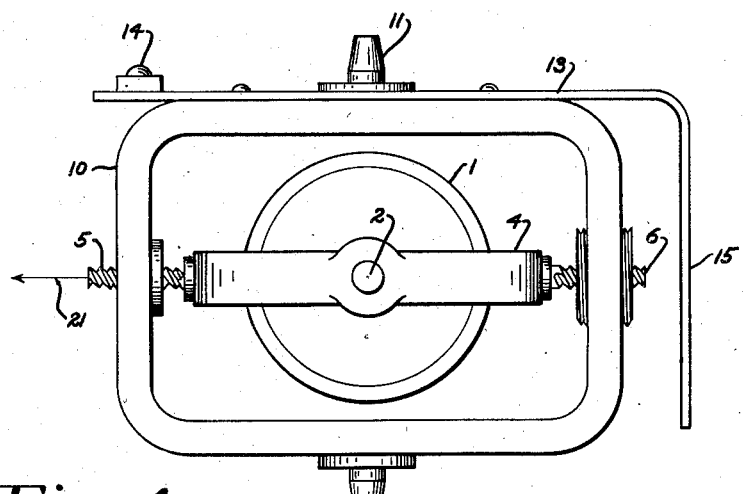
Figure 4 is a view in top plan of the rotor and the inner and outer gimbal with a pointer connected to the outer gimbal and extending thereover to a position that it would occupy when applied to the face of a climb indicator for indicating climb and dive.

Now, referring to Figures 3 and 4, assume the assembly to be used as the operating control mechanism for a climb and dive indicator, or an automatic pilot for climb and dive control. In such a case the trunnions 11 and 12 are disposed athwartships with the aircraft flying toward the left in the direction indicated by the arrow 21 as the pointer 15 extends over the face of the panel instrument. It will be appreciated that as the aircraft assumes a climb or dive attitude the outer gimbal remains and the scaled dial of the gyro box by reference to the pointer gives a reading of climb or dive. Should the gyro precess, the inner gimbal screw pivots 5 and 6 rotate in their ball bearings in races 7 and 8 and the inner gimbal and its rotor shift linearly to the rear, or forwardly, in accordance with the direction of precession, as shown in Figure 4.

This shift of weight of the inner gimbal and gyro rotor overbalances the outer gimbal resulting in a corresponding torque on the outer gimbal about its trunnions 11 and 12 to the rear or forwardly. This brings forces into action resulting in an automatic erection of the gyro.

It follows that when the erection system is applied to a bank indicator, or pilot for controlling bank, the spin axis of the rotor is normally vertical, the screw pivots 5 and 6 of the inner gimbal are disposed athwartships and the outer gimbal trunnions 11 and 12 are longitudinal with respect to the aircraft. Thus a precession of the gyro brings about a rotation of the inner gimbal in an athwartship plane and a linear shift in that plane. This shift of the center of gravity of the gyro assembly overbalances the outer gimbal resulting in a consequent shift of the outer gimbal about its longitudinally disposed trunnions 11 and 12. This likewise brings forces into action resulting in automatic erection of the gyro.

In both cases the signal may be taken off of the movement of the outer gimbal by having the latter carry the usual shroud and the frame, or gyro box, the pick-off systems for operation of the usual relays or amplifiers of the conventional pneumatic, hydraulic or electric systems.

Figure 5:
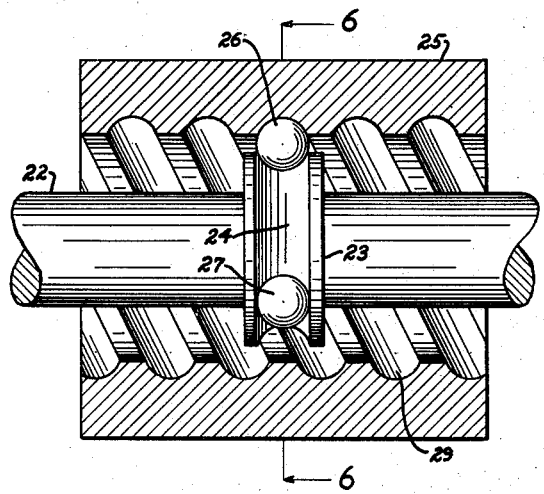
Figure 5 is a view in longitudinal section shown through a modified form of outer gimbal nut, showing the trunnion and balls in side elevation.
Figure 6:
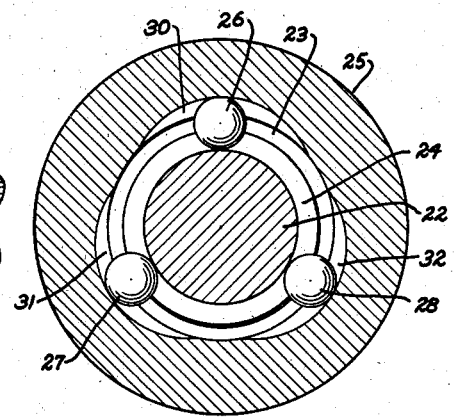
Figure 6 is a view in cross section taken along line 6—6 of Figure 5.

Figures 5 and 6 show a modified form of inner gimbal trunnion and the bearing it engages in the outer gimbal. In this embodiment of the invention the same result of permitting shifting of the inner gimbal and its trunnion in its plane of suspension in the outer gimbal under the influence of gyro precession. Here the trunnion 22 is provided with a ball retainer 23 with a single groove 24. The nut 25 is rigid with the outer gimbal and is provided with a triple thread groove in its inner surface to cooperate with the ball retainer 23 to retain the three balls 26, 27 and 28 in such a manner that each ball engages groove of the continuously spiral groove generally indicated at 29 in Figure 5. As indicated in the cross sectional view of Figure 6, ball 26 is engaging groove 30, ball 27 groove 31, and ball 28 groove 32. Upon precession of the gyro about its inner gimbal axis, fore and aft or athwartships, as the case may be as discussed hereinbefore in connection with Figures 1 to 4, inclusive, the inner gimbal trunnion 22 as it rotates also linearly shifts its position in its plane of suspension in the nut 25 which is rigid with the outer gimbal.

Figure 7:
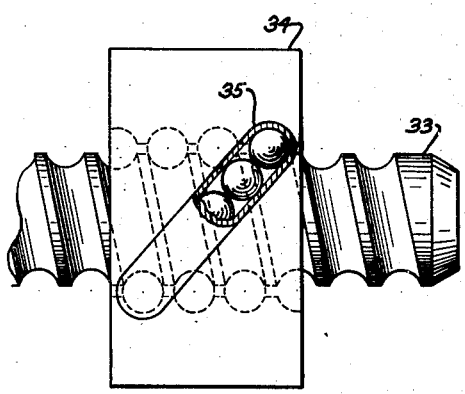
Figure 7 is a view in top plan of a modified form of trunnion and ball bearing assembly, partly in section.
Figure 8:
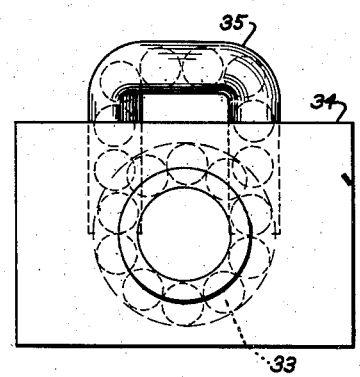
Figure 8 is a view in side elevation of the form shown in Figure 7.

The same is true with respect to the modified form of inner gimbal trunnion and bearing assembly carried by the outer gimbal for supporting the trunnion. Here the trunnion 33 is provided with a single lead thread as is also the case with the groove in the inner surface of the nut 34 carried by the outer gimbal. The nut 34 surrounds trunnion 33 and the threads on the trunnion and the grooves in the nut cooperate to receive the ball bearings. Extending into the nut is a removable inverted hollow U-shaped member 35 that extends diagonally to embrace four threads of the trunnion, as shown in Figure 7. A sufficient number of balls may be inserted to fill the grooves of the nut and the retainer 35. A continued relative rotational movement, and consequent relative linear movement, between the nut and the trunnion would eventually cause a travel of a ball from one end of the retainer 35 through the nut grooves and four trunnion threads to the other end of the retainer 35. The assembly provides a continuous spiral groove retainer for the balls and permits the trunnion to move linearly in either direction as it rotates in the nut.

It will thus be seen from the foregoing that the new and novel gyro erecting system is adaptable for use in either a climb indicator or an automatic pilot for the control of climb, or in a bank indicator or an automatic pilot for the control of bank, and that the self-erecting system is inherent in the suspension system, without the use of the usual delicate precision and untrustworthy erection pendulums for controlling the air ports, and in which the erection means indicates and compensates for changes in the normal relationships between the spin axis of the rotor and the gyro box to maintain the rotor spin axis erect entirely independent of and unaffected by changes in air density at various altitudes or the presence of rarefied air at high altitudes. It is, of course, to be understood that the gyro rotor may be driven by any desired means and in the event that it is to be spun pneumatically, appropriate arrangement of an air nozzle and connections therefrom to the air trunnions 11 and 12 of the outer gimbal may be employed.

I claim:

1. A self-erecting gyro vertical comprising a gyroscope supported on horizontal axes in substantially neutral equilibrium and with its rotor having a normally vertical spin axis, an outer gimbal pivotally supported about one horizontal axis by a stationary frame, an inner gimbal carrying said rotor and pivotally connected to said outer gimbal about an horizontal axis at right angles to that of the latter by a pair of multilead screw pivots engaging ball bearing assemblies anchored in said outer gimbal and having predeterminedly spaced balls to separately engage each screw thread whereby a bodily linear shifting of said inner gimbal with its rotor occurs in a predetermined direction coincident with its axis of suspension in said outer gimbal as the inner gimbal rotates about its axis in response to precessional variations of normal relationship between the rotor spin axis and its gimbal suspension.

2. In a gyro vertical comprising a gyroscope supported on horizontal axes with its rotor having a normally vertical spin axis, gyro erecting means including an outer gimbal pivotally supported about one horizontal axis by a stationary frame, an inner gimbal carrying said rotor and pivotally connected to said outer gimbal about an horizontal axis at right angles to that of the latter by a pair of multilead screw threaded pivots carried by said inner gimbal and engaging outer gimbal supported ball bearing assemblies with predeterminedly spaced balls to separately engage each screw thread whereby a bodily linear shifting of said inner gimbal with its rotor occurs in a predetermined direction coincident with its axis of suspension in said outer gimbal as the inner gimbal rotates about its axis in response to precessional variations of normal relationship between the rotor spin axis and its gimbal suspension to effect a corresponding movement of said outer gimbal about its axis as a result of said shift of mass of said inner gimbal and rotor.

3. In a gyro vertical for aircraft, a gyroscope supported on horizontal axes in substantially neutral equilibrium and with its rotor having a normally vertical spin axis, gyro erecting means for maintaining said spin axis vertical with respect to the aircraft including an outer gimbal pivotally supported about a transverse axis by a frame carried by said aircraft, an inner gimbal carrying said rotor and pivotally connected to said outer gimbal about a longitudinal axis by means whereby the longitudinal shifting of said inner gimbal and its rotor in said outer gimbal occurs as the inner gimbal rotates about its axis in response to precessional variations of normal relationship between the rotor spin axis and its gimbal suspension, said suspension means for said inner gimbal in said outer gimbal comprising a pair of multilead screw threaded pivots and a pair of ball bearing assemblies anchored in said outer gimbal each including a plurality of balls predeterminedly spaced to separately engage separate threads of its pivot to permit rotative and linear movement of said inner gimbal in said outer gimbal.

4. In a gyro vertical for aircraft, a gyroscope supported on horizontal axes in substantially neutral equilibrium and with its rotor having a normally vertical spin axis, gyro erecting means for maintaining said spin axis vertical with respect to the aircraft including an outer gimbal pivotally supported about a longtudinal axis by a stationary frame carried by said aircraft, an inner gimbal carrying said rotor and pivotally connected to said outer gimbal about a transverse axis by means whereby the transverse shifting of said inner gimbal and its rotor in said outer gimbal occurs as it rotates about its transverse axis in response to precessional variations of normal relationship between the rotor spin axis and its gimbal suspension, said suspension means for said inner gimbal in said outer gimbal comprising a pair of multilead screw threaded pivots and a pair of ball bearing assemblies anchored in said outer gimbal each including a plurality of balls predeterminedly spaced to separately engage separate threads of its pivot to permit linear as well as rotative movement of said inner gimbal in said outer gimbal.

5. In a gyro vertical for aircraft, a gyroscope including means for supporting the same on horizontal axes in substantially neutral equilibrium and with its rotor having a normally vertical spin axis, said supporting means comprising an outer gimbal pivotally supported about one horizontal axis by a frame carried by said aircraft, an inner gimbal carrying said rotor and pivotally connected to said outer gimbal about an horizontal axis at right angles to that of the latter by means whereby the bodily linear shifting of said inner gimbal and its rotor occurs in a predetermined direction coincident with its axis of suspension in said outer gimbal in response to precessional variations of normal relationship between the rotor spin axis and its gimbal suspension to effect a corresponding movement of said outer gimbal about its axis as a result of said shift of mass of said inner gimbal in said outer gimbal comprising a pair of multilead screw threaded pivots and a pair of ball bearing assemblies anchored in said outer gimbal each including a plurality of balls predeterminedly spaced to separately engage separate threads of its pivot to permit linear movement of said inner gimbal in said outer gimbal.

6. A self-erecting gyro vertical, comprising a gyroscope supported on horizontal axes in substantially neutral equilibrium and with its rotor having a normally vertical spin axis, an outer gimbal supported about one horizontal axis by a stationary frame, an inner gimbal carrying said rotor, means for pivotally connecting said inner gimbal to said outer gimbal about an horizontal axis at right angles to that of the latter, said means comprising a pair of single lead screw threaded inner gimbal pivots and bearing assemblies carried by said outer gimbal, each of said bearing assemblies comprising a nut with a single lead spiral groove and a tube connecting the two ends of said groove to provide a continuous and repeating helical guideway for ball bearings retained by the groove and the threads of said pivot whereby a bodily linear shifting of said inner gimbal and its rotor occurs in a predetermined direction coincident with its axis of suspension in said outer gimbal in response to precession of said gyro and consequent rotation of said inner gimbal for shifting the center of gravity of the assembly to overbalance the outer gimbal to effect an erection of the gyro.

SAMUEL BOUSKY.

REFERENCES CITED

The following references are of record in the file of this patent:

UNITED STATES PATENTS

| Number | Name | Date |
| --- | --- | --- |
| 111,923 | Findlay et al. | Feb. 21, 1871 |
| 975,591 | Whitney | Nov. 15, 1910 |
| 1,825,345 | Fieux | Sept. 29, 1931 |
| 1,967,482 | Schmidt | July 24, 1934 |